No. 863,948. PATENTED AUG. 20, 1907.
E. M. SPENCE.
CULTIVATOR ARCH.
APPLICATION FILED OCT. 30, 1906.

2 SHEETS—SHEET 1.

Witnesses
W. N. Rockwell
James W. Quinn

Inventor
Enoch M. Spence
By Chamales Bransfield
Attorneys

No. 863,948.
PATENTED AUG. 20, 1907.
E. M. SPENCE.
CULTIVATOR ARCH.
APPLICATION FILED OCT. 30, 1906.
2 SHEETS—SHEET 2.
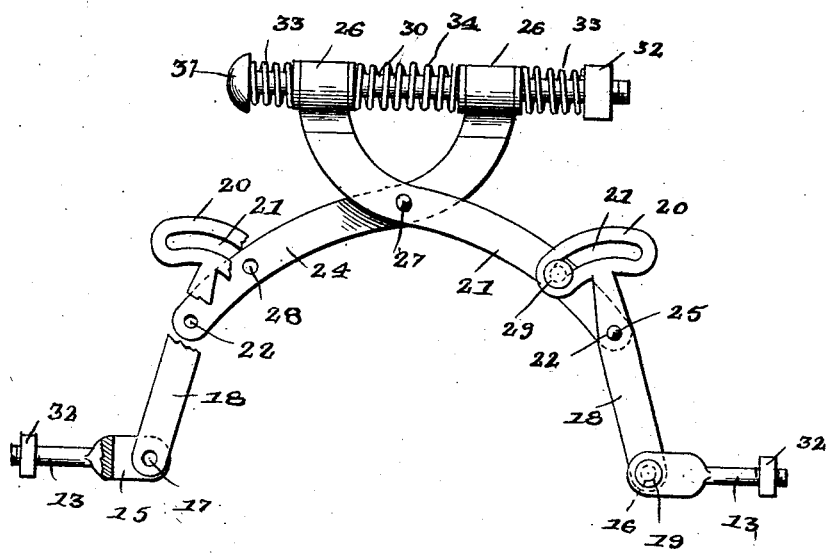
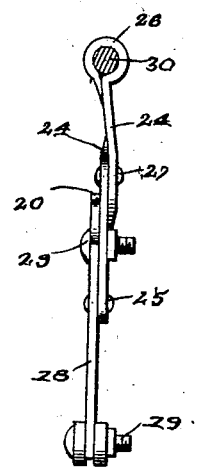
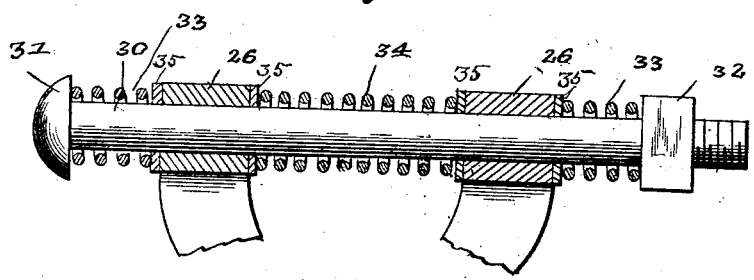
Witnesses
W. S. Rockwell
James W. Quinn
Inventor
Enoch M. Spence
By Chandlee & Chandlee
Attorneys

UNITED STATES PATENT OFFICE.

ENOCH M. SPENCE, OF GRANBURY, TEXAS.

CULTIVATOR-ARCH.

No. 863,948.             Specification of Letters Patent.             Patented Aug. 20, 1907.

Application filed October 30, 1906. Serial No. 341,212.

*To all whom it may concern:*

Be it known that I, ENOCH M. SPENCE, a citizen of the United States, residing at Granbury, in the county of Hood, State of Texas, have invented certain new and useful Improvements in Cultivator-Arches; and I do hereby declare the following to be a full, clear, and exact description of the invention, such as will enable others skilled in the art to which it appertains to make and use the same.

This invention has relation to cultivator arches for adjusting the beams of the implement that carry the plow standards and plows or cultivator points so as to perform wider or narrower work.

It is the object of the invention to provide means that may be convenient and efficient in use in securing a normal adjustment of the beams and that will allow the plows and their beams to spread or yield laterally in case a stump, grub, or stone should be encountered between the plows of greater width than could be passed by the plows under the normal adjustment of the beams.

The invention is shown as embodied in the implement portrayed in the annexed drawings forming a part of this specification, in view of which it will first be described with respect to its construction and mode of operation, and then be pointed out in the subjoined claims.

Figure 1:
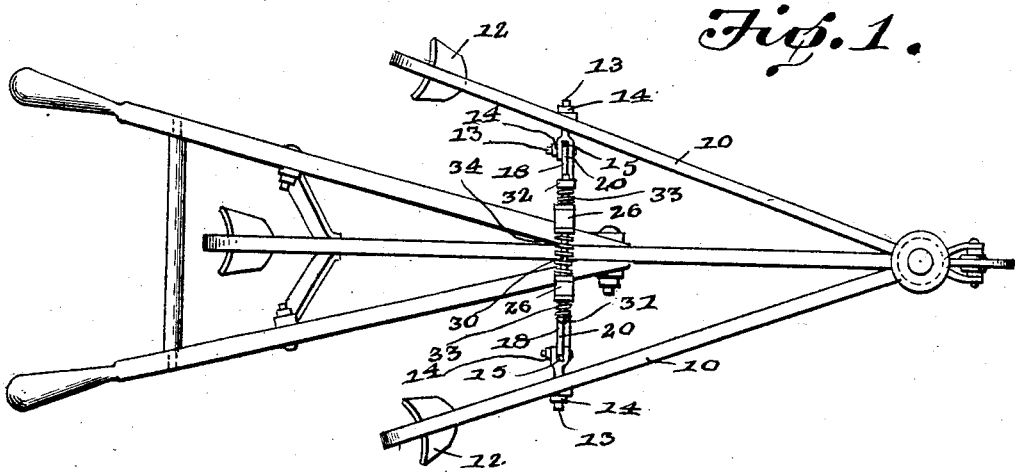
Figure 2:
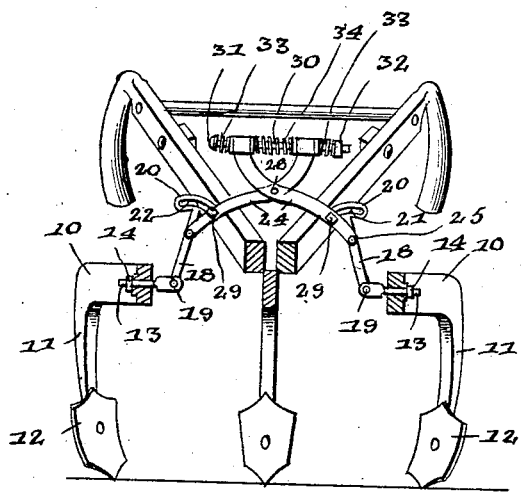

Of the said drawings—Figure 1 is a plan of a cultivator, or so much thereof as it is necessary to show, having my improved arch attached thereto, Fig. 2 is a cross section of the same, looking rearwardly. Fig. 3 is a front view of the arch detached. Fig. 4 is an edge view. Fig. 5 is a view in the plane of the rod and associated parts above the arch proper, which parts comprise the compensatory adjusting means.

Similar numerals of reference designate similar parts or features, as the case may be, wherever they occur.

In the drawings 10 designates the cultivator beams equipped with standards 11 carrying plows or cultivator points 12. The beams 10 are arranged so that their forward ends are closer together than the rearward ends, and it is the adjustment of the said beams wider apart or nearer together, so that the implement may perform wider or narrower work on the ground surface, as it is drawn along, to which the present invention is applicable. The cultivator may be of any kind employing two beams capable of receiving the invention.

13 designate bolts, having nuts 14 turned upon their screw-threaded lower ends in order to secure them to the beams. Other suitable means for securing the bolts to the beams may be employed, if desired. The inner ends of the bolts 13 are bifurcated, as at 15, which bifurcated ends are provided with perforations 16 through which and the perforations 17 on the lower ends of the legs 18 are passed bolts 19, thus pivotally connecting the legs at their lower ends with the bolts.

The legs 18 are provided at their upper ends with cross-heads 20 in which are formed segmental slots 21 concentric with the perforations 22 in said legs, through which latter and through holes 23 move through the lower ends of the arch-arms 24 rivets 25 or similar means are passed to pivotally connect the arms with the legs. The latter are of a substantially ogee form in side view, provided at their upper ends with loops or eyes, 26, and crossed a short distance above their centers where they are pivotally connected, as at 27. Midway between the pivotal points 22 and 27 the arch arms are provided with holes or perforations 28 through which and through the segmental slots 21 nut-receiving bolts 29 are passed to adjustably connect the upper ends of the legs 18 with the arch arms, thus adjusting the distance apart of the cultivator beams. The form of the cross heads 20 and of the segmental slots 21 with respect to the point of connection of the legs with the cross heads is such that the limitation of adjusting the cultivator beams nearer together from said point of connection is less than that of adjusting them to wider work from the said point; it being understood that as the bolts 29 connect the arms and legs nearer the inner ends of the slots 21 the beams of the cultivator will be brought closer together, and that when the said bolts connect the arms and legs nearer the outer ends of the said slots the beams will be more greatly separated.

30 designates a rod provided on one end with a head 31 and screw-threaded at the other end to receive a nut, 32, which is passed through the eyes 26 on the upper ends of the arch arms, said bolt projecting at each end beyond the said eyes. Expansible springs 33 coiled about the ends of the rod between the ends of the head of and nut on the ends of the rod, tend to force the upper ends of the arms together; and an expansible spring, 34, coiled around the said rod between the said eye-provided ends of the arms tend to force them apart.

It will now be made clear to those skilled in the art that the cultivator beams may be normally adjusted with respect to their distance apart, and hence the width of strip of ground cultivated by them, by the point at which the upper ends of the legs are joined with the arch arms in the segmental slot 21, and that if a stump, stone or other obstruction should be passed and straddled by the forward ends of the beams, and be too wide to pass between the most closely adjusted pair of plows, the latter may strike the sides of said obstruction, forcing the beams apart by reason of the yielding connection of the upper ends of the arch arms, and thus allow the plows to pass the obstruction, after which the beams will be restored to normal position by means of the springs 33 acting upon the outer sides of the said upper ends of the arms. It is here that the gist of my invention resides, and to which I make broad claims, namely, that of means whereby the plow-carrying means may be yieldingly adjusted with respect to their distance apart so that any obstruction met between the plows, that has been straddled by the forward ends of the beams and too wide to pass between the plows in normally adjusted position, will allow the plows to yield laterally and the obstruction to be passed, and the beams and plows to be then restored to normal position.

It is obvious that changes may be made in the form and arrangement of parts shown as embodying the invention without departing from its general nature or spirit.

What is claimed is—

1. A cultivator arch comprising legs and arch arms, means for fixedly adjusting the legs to the arch-arms, and means for yieldingly connecting the arch-arms with each other.

2. A cultivator arch and its legs, means for fixedly adjusting the legs with respect to the arch, and means yieldingly connecting the legs through the arch.

3. The combination, with the arch-arms of a cultivator, of means for yieldingly connecting them.

4. The combination, with the cultivator beams, of the arch having legs connected with the beams, and arms adapted to be fixedly connected with and adjusted with respect to the legs, and yielding means for adjusting the arms.

In testimony whereof, I affix my signature, in presence of two witnesses.

ENOCH M. SPENCE.

Witnesses:
 HENRY MEYER,
 C. A. ROE.